(12) United States Patent
Linney et al.

(10) Patent No.: US 10,855,373 B2
(45) Date of Patent: Dec. 1, 2020

(54) FIBRE NETWORK PROXY

(71) Applicant: BRITISH TELECOMMUNICATIONS PLC, London (GB)

(72) Inventors: Trevor P Linney, London (GB); David J Thorne, London (GB); Leslie D Humphrey, London (GB); Christopher M Croot, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/915,716

(22) PCT Filed: Sep. 4, 2014

(86) PCT No.: PCT/GB2014/000348
§ 371 (c)(1),
(2) Date: Mar. 1, 2016

(87) PCT Pub. No.: WO2015/033091
PCT Pub. Date: Mar. 12, 2015

(65) Prior Publication Data
US 2016/0204864 A1     Jul. 14, 2016

(30) Foreign Application Priority Data

Sep. 9, 2013   (GB) .................................. 1316053.6
May 15, 2014  (EP) .................................... 14250075

(51) Int. Cl.
*H04B 10/27*     (2013.01)
*H04L 12/28*     (2006.01)
(Continued)

(52) U.S. Cl.
CPC ......... *H04B 10/27* (2013.01); *H04L 12/2858* (2013.01); *H04L 12/2869* (2013.01); *H04B 10/07955* (2013.01); *H04B 10/808* (2013.01)

(58) Field of Classification Search
None
See application file for complete search history.

(56) References Cited

U.S. PATENT DOCUMENTS 6,128,016 A  * 10/2000  Coelho .................. G06F 3/033
                                                          707/999.102
6,725,264 B1 *  4/2004  Christy ............. H04L 29/12009
                                                          370/389
(Continued)

OTHER PUBLICATIONS

"Network Function Virtualisation; Use Cases", Group Specification, GS NFV 009 V012 (Aug. 2013) Sep. 4, 2013 (22 pgs.).
(Continued)

*Primary Examiner* — Jai M Lee
(74) *Attorney, Agent, or Firm* — Nixon & Vanderhye P.C.

(57) ABSTRACT

In an FTTDP optical fibre network, Distribution point units are reverse powered by customer premises equipment and therefore liable to power failure. When the distribution point unit loses power it is unavailable to respond to requests for performance or metric data. A persistent manager agent functions as a proxy for the distribution point unit, gathering metric and performance data from the distribution point unit using at least one EOC channel and handling requests for performance and metric data issued from other network devices. The persistent manager can also schedule downloads of firmware and configuration data to the distribution point unit.

2 Claims, 3 Drawing Sheets

(51) Int. Cl.
*H04B 10/079* (2013.01)
*H04B 10/80* (2013.01)

(56) References Cited

U.S. PATENT DOCUMENTS

| | | | | |
|---|---|---|---|---|
| 7,483,632 | B2 * | 1/2009 | Sung | H04L 47/10 398/63 |
| 7,610,357 | B1 * | 10/2009 | Chandrachood | H04L 41/0213 709/217 |
| 8,160,448 | B2 * | 4/2012 | Tsuge | H04L 41/0226 398/115 |
| 8,818,192 | B1 * | 8/2014 | Smith | H04B 10/27 398/72 |
| 8,831,425 | B1 * | 9/2014 | Bernstein | H04B 10/27 398/70 |
| 9,094,739 | B2 * | 7/2015 | Ousley | H04L 63/105 |
| 2005/0025165 | A1 * | 2/2005 | Lee | H04L 29/12283 370/401 |
| 2006/0159108 | A1 * | 7/2006 | Chan | H04L 12/2898 370/401 |
| 2007/0067445 | A1 * | 3/2007 | Vugenfirer | H04L 67/40 709/224 |
| 2007/0214270 | A1 * | 9/2007 | Absillis | H04L 61/2015 709/227 |
| 2008/0101793 | A1 * | 5/2008 | Koch | H04L 29/12009 398/1 |
| 2008/0232801 | A1 * | 9/2008 | Arnold | H04Q 11/0067 398/58 |
| 2009/0013210 | A1 * | 1/2009 | McIntosh | H04L 41/0672 714/4.1 |
| 2009/0016721 | A1 * | 1/2009 | Wurst | H04J 3/14 398/67 |
| 2009/0175276 | A1 * | 7/2009 | Tsuge | H04L 12/2856 370/392 |
| 2011/0064212 | A1 * | 3/2011 | Cooper | H04M 19/08 379/307 |
| 2011/0069953 | A1 * | 3/2011 | Bronstein | H04B 10/27 398/45 |
| 2014/0314413 | A1 * | 10/2014 | Zheng | H04L 12/2861 398/67 |
| 2016/0182150 | A1 * | 6/2016 | Sprenger | H04B 10/07955 398/5 |

OTHER PUBLICATIONS

Les Humphrey, "On managing FTTdp nodes with intermittent powering", NPIF bbf2012 280 02 FAST Dazzle FTTdp Architecture, Aug. 21, 2012 (2 pgs.).
"WT-318 Management Architecture and Requirements for FttDP", Draft bbf2013.460, Revision 01, Aug. 2013 (17 pgs.).
N. Bitar et al., Applicability of the Access Node Control Mechanism to Broadband Networks Based on Passive Optical Networks (PONs); Internet Engineering Task Force (IETF); Jun. 18, 2013 (39 pgs.).
International Search Report for PCT/GB2014/000348, dated Nov. 11, 2014, 2 pages.
Bitar et al., "Applicability of the Access Node Control Mechanism to Broadband Networks Based on Passive Optical Networks (PONs); rfc6934.txt", Internet Engineering Task Force, IETF. Jun. 18, 2013, pp. 1-39.
Author unknown, "Network Function Virtualisation; Use Cases; GS-NFV-009v012-clean_irc-DEAC", ETSI Draft; GS-NFV-009V012-Clean_IRC-DEAC, European Telecommunications Standards Institute (ETSI), vol. ISG. No. V012. Sep. 4, 2013, pp. 1-54.
"G.fast", http://en.wikipedia.org/w/index.php?title=G.fast&oldid=606542214, retrieved Aug. 22, 2014, 3 pages.
Humphrey, "On managing FTTdp nodes with intermittent powering", Aug. 21, 2012, 2 pages.
Author Unknown, WT-318 "Management Architecture and Requirements for FttDP", Revised Aug. 2013, 17 pages.
S. Ooghe et al.; Internet Engineering Task Force (IETF) Memo; "Framework and Requirements for an Access Node Control Mechanism in Broadband Multi-Service Networks"; May 2010 (47 pgs.).
Search Report dated Mar. 5, 2019 issued in Chinese Application No. 201480049542.6 (2 pgs.).

* cited by examiner

FIBRE NETWORK PROXY

This application is the U.S. national phase of International Application No. PCT/GB2014/000348 filed 4 Sep. 2014, which designated the U.S. and claims priority to GB Patent Application No. 1316053.6 filed 9 Sep. 2013, and EP Patent Application No. 14250075.0 filed 15 May 2014, the entire contents of each of which are hereby incorporated by reference.

BACKGROUND

The present invention relates to telecommunication nodes, and in particular a method and apparatus representing reverse powered distribution point units in an optical data network.

The Fibre-to-the-x (FTTx) family of network architecture protocols are now commonly deployed in order to replace all or a part of the copper twisted pair telecommunication network with optical fibre up the last mile. The technologies include Fibre to the Node (FTTN), Fibre to the Cabinet (FTTC) and Fibre to the Home (FTTH). As the fibre termination moves closes to the customer premises, the remaining copper twisted pair can carry greater bandwidth to the home premises but the costs to the broadband network provider to deploy the fibre replacement increase significantly.

In an attempt to extend the optical fibre portion of the network closer to the customer premises without significantly increasing cost, a Fibre-to-the Distribution Point (FTTDP) protocol is being standardised by the International Telecommunication Union (ITU) under the name G.Fast which should eventually deliver 1 Gb/s over short lengths of copper.

Distribution points are significantly smaller than street-side cabinets and therefore may be installed on telephone poles, or in footway boxes or underground chambers. However, the flexibility of where they can be physically placed also causes complications in terms of delivering power to the distribution points since optical fibre cannot supply power. To avoid costly energy contracts to supply power to the distribution points, in G.Fast it is proposed that the distribution points are reverse-powered by the customer premises units connected to them, using the existing wired telephony cabling.

With this necessity for distribution points based on G.Fast to be reverse-powered from the customer's premises, it can no longer be assumed that this particular Network Element (NE) will always be powered up. Whilst a single active customer premises equipment is generally sufficient to maintain power to the core general functions of the distribution point, when all the customer premises equipment connected to a given distribution point turn off, then the distribution point itself will also power down and therefore be unresponsive to any requests for information from any network devices within the overall network until power is restored.

Battery backup has been proposed to address this problem. However batteries only have a finite, charge and it is not possible to determine when power will be restored. Adding larger batteries makes the distribution point unit larger in order to store the batteries and furthermore, more power would need to be drawn from the reverse-power system in order to keep the batteries charged.

Therefore the presence of batteries to maintain power to the distribution point creates many new problems. At most they can provide a short time in which to allow a graceful shutdown at the cost of requiring replacement batteries every few years Aspects of the present invention address the above problems.

SUMMARY OF THE EXAMPLE EMBODIMENTS OF INVENTION

An embodiment of the invention provides an optical fibre network comprising an optical fibre network section, a plurality of distribution nodes linking the optical fibre network section to a plurality of customer premises units via a plurality of electrical wired segments, each distribution node being electrically powered by at least one of the customer premises units, wherein the optical fibre network section further includes at least one proxy management unit in communication with at least one of the plurality of distribution nodes and operable to receive management data from said distribution unit and to process requests for information on behalf of said distribution unit.

In another aspect, the invention provides a management apparatus for receiving status information from a network node and answering requests for status information from other devices on behalf of said network node.

Embodiments of the invention provide a network proxy device known as a persistent management agent for each distribution point unit in the broadband communication network. The proxy management servers process received status information and generate new metrics for answering status queries.

BRIEF DESCRIPTION OF THE DRAWINGS

The present invention will now be described with reference to the accompanying figures in which.

DETAILED DESCRIPTION OF THE PRESENT EXAMPLE EMBODIMENTS

Figure 1:
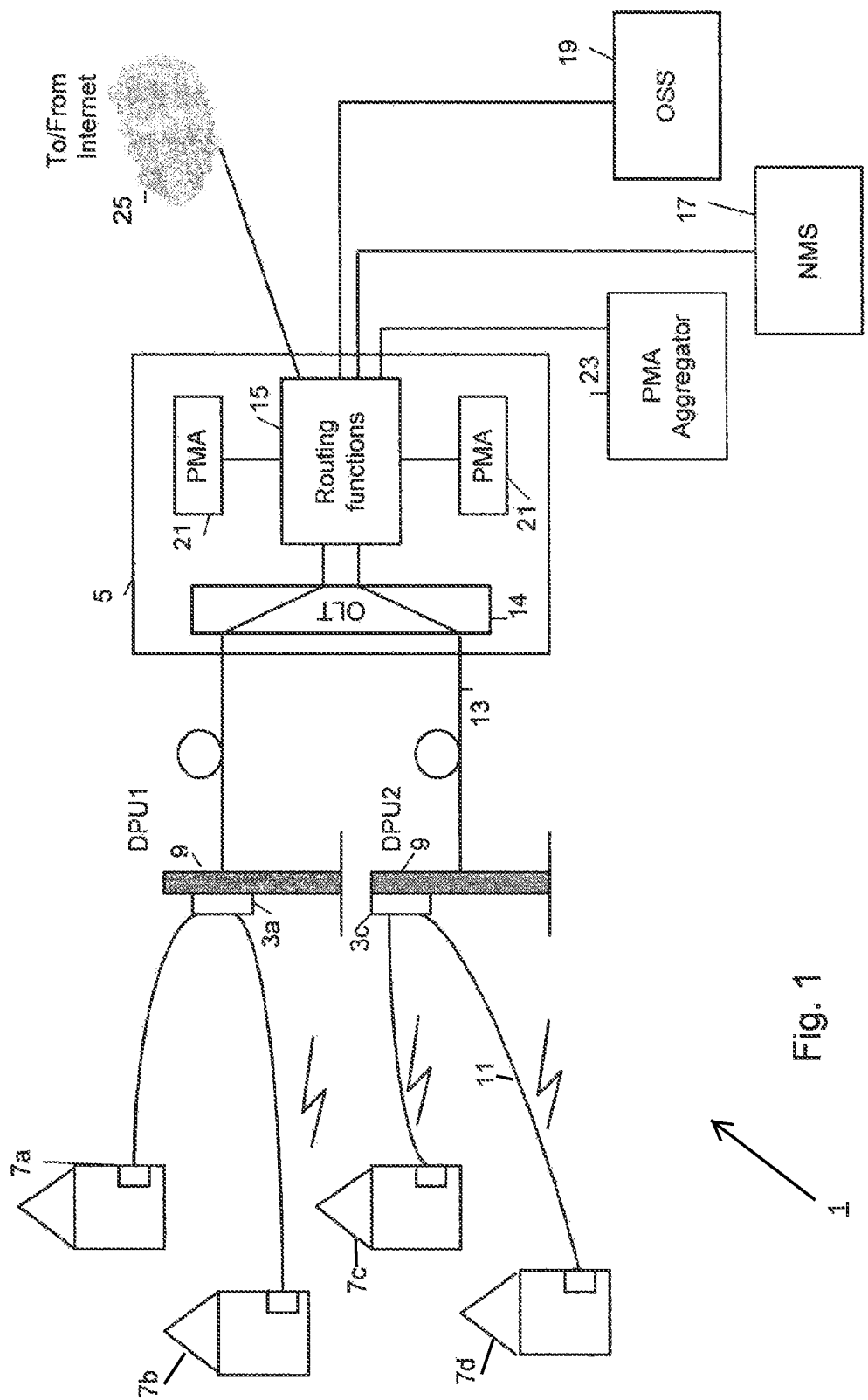
FIG. 1 schematically shows an FTTDP network in accordance with a first embodiment of the present invention.

FIG. 1 shows a Fibre to the Distribution Point (FTTDP) optical network 1 in a first embodiment. In this embodiment the optical network is a Passive Optical Network (PON). In FTTDP, distribution point units 3 (DPU) are used to provide the conversion between optical signals generated in an optical head-end unit 5 and customer premises equipment 7 (CPE). Such DPUs 3 are small enough to be mounted on poles-9 and are located much closer to CPEs 7 than traditional cabinets used in FTTC (not shown). In other cases, DPUs 3 can be mounted in footway boxes and underground chambers connected to underground wires contained in ducts. In this embodiment, each DPU is typically located on a pole with an overhead drop wire 11 connecting to the CPEs 7 and an optical fibre 13 connecting the DPU 3 to the head-end unit 5. In FIG. 1, CPEs 7a and 7b are connected to DPU 3a and the CPEs 7c and 7d are connected to DPU 3b.

Unlike FTTC cabinets which have a dedicated mains power supply, the DPU 3 must be reverse powered via each electrical drop wire 11 from each CPE 7. In this embodiment, each CPE 7 connection is sufficient to maintain the core functionality of the DPU 3. Examples of the reverse powering scheme can be found in European patent application EP2013250085.1.

The DPUs 3 are linked to the head-end unit 5 by a fibre optic line 13. The head-end unit 5 contains an Optical Line Terminal 14 to convert data destined for the recipient DPU 3 into optical signals for transmission over the fibre optic line 13 and to convert received optical signals from a DPU3 back into an electrical interface. Once converted, the signals received at the head-end unit 5 are routed to their destination by a routing function 15. The routing function 15 ensures that control data and/or internal network data is routed to other network functions such as a Network Management System 17 (NMS), an Operation Support Systems 19 (OSS), one or more persistent management agents 21 (PMA) or a PMA Aggregator 23. The routing function 15 also ensures that external data traffic is routed to external networks such as the Internet 25.

Maintaining an event log and history of the status and load of each CPE 7 and DPU 3 is particularly important in this FTTDP network 1 setup due to the reverse powering constraint. Since the power to a line cannot be guaranteed at all times, information may be lost if the status and configuration metrics are stored at the DPU 3 and all of its connected CPEs 7 are turned off. Furthermore any functions in the network core 5 such as the NMS 17 or OSS 19 which request data while a particular DPU 3 is unpowered will not be able to establish a connection and may waste resources trying to repeat the request until the DPU 3 does eventually power on. Finally, in traditional networks loss of power to a network element is treated as an alarm, and this is not appropriate here.

To overcome these problems, in this embodiment, a PMA 21 is introduced into the network core 5 to act as a proxy/manager for the DPU 3. In this embodiment, there is a one to one mapping between DPUs 3 and PMAs 21. Each DPU 3 is configured to send metric data to its associated PMA 21 as soon as it is generated. The PMA then handles all requests relating to the status and configuration of the DPU 3 regardless of whether the DPU 3 is operational at the time of the request, although the PMA 21 is able to determine the power status of the DPU 3. As will be described in more detail below, with the change in network architecture, the PMA 21 is also able to perform other actions including:

Firmware download and management;
Initial provisioning;
Configuration, including rate control;
Test and diagnostics;
Statistics gathering; and
Event reporting.

In this embodiment, each PMA 21 is a proxy for a single DPU 3. The PMAs 21 perform aggregation of metric data to generate new measures and values. To improve scalability within the optical network and the large numbers of PMAs 21, a PMA aggregator 23 is configured to aggregate the large volume and data and serve it to requests from the NMS 17 or OSS 19.

Overview of DPU

Figure 2:
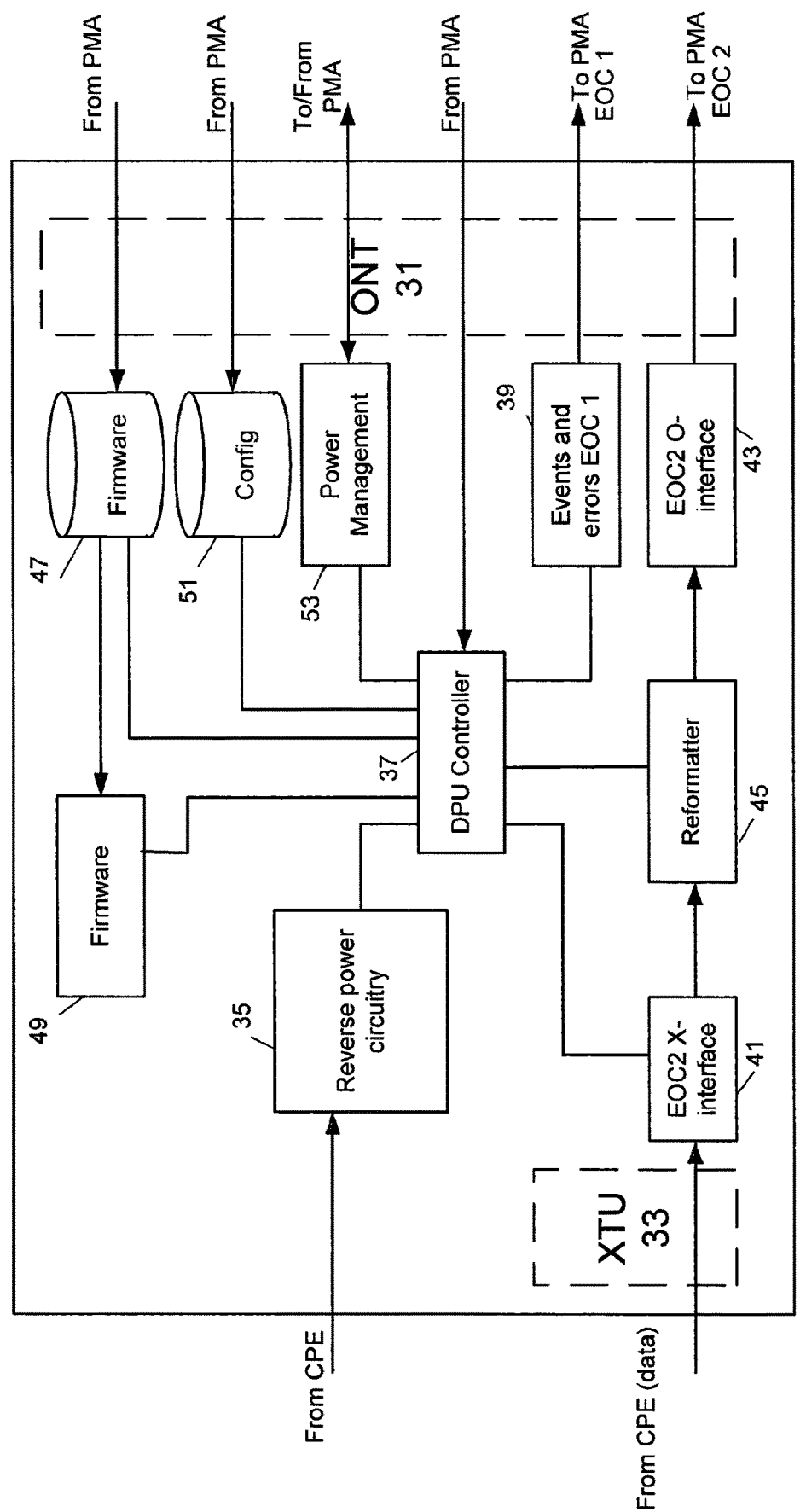
FIG. 2 schematically shows a distribution point unit (DPU) in more detail.

FIG. 2 shows the distribution point unit 3 (DPU) in more detail. For external communication, the DPU 3 comprises an optical network terminal 31 (ONT) for converting between optical signals conveyed over the optical fibre 13 linking the DPU 3 to the network core 5 and xDSL signaling conveyed through an xDSL terminating unit 33 (XTU) to the drop wire 11 linking the DPU 3 to the customer premises.

The DPU 3 includes reverse powering circuitry 35 to extract power from each connected drop line 11 and a DPU controller 37 controls the provision of power within the DPU 3.

To send information to the corresponding PMA 21, an events and errors log 39 contains all statistical data relating to the operation of the DPU 3 and any data relating to the DPU is sent to the PMA 21 using a first Embedded Operations Channel (EOC).

Since the status of the CPE 7 is also relevant, the DPU 3 also forwards any messages and alerts relating to the CPE 7 to the PMA 21 using a second EOC. An EOC 2 xDSL side interface 41 receives metric data from the CPE 7 from the XTU 33 and an EOC 2 ONU side interface 43 sends the data to the PMA 21. A reformatter 45 is present for any necessary conversion.

While the PMA can set items such as the Profile, limit PSD mask and band plan, examples of the type of information sent to the PMA include:

Code Violation (upstream & downstream) events;
Forward Error Corrections (upstream & downstream) events;
Transmission system;
Power management state;
Initialization Success/Failure cause;
Line & Signal Attenuations (upstream & downstream);
Signal to Noise Martin information (upstream & downstream);
Actual Data Rate (upstream & downstream);
Max Attainable Data Rate (upstream & downstream);
Quiet Line Noise (upstream & downstream); and/or
HLog (upstream & downstream).

To support other functions, the DPU controller is also configured to receive firmware updates into a firmware store 47 from the PMA which can then be used to update the firmware 49 as well as configuration updates into a configuration store 51. A further function is power management including the ability to send a "dying gasp" message in the event of power loss to send a final burst of data. This also notifies the PMA 21 that the DPU 3 has lost power.

The DPU 3 in the first embodiment is simplified by removing status reporting functions to the PMA 21.

PMA

The requirements for the PMA are given below:
1. There is one and only one PMA per DPU, but the NMS may aggregate PMAs;
2. The PMA must support all OSS/NMS management actions on a given DPU irrespective of whether that DPU, or any of its lines are powered up;
3. The PMA must be able to report the power state of its DPU, and each line, on request;
4. The PMA must spontaneously report when the DPU is powered down, and powered up if configured to do so. It can also be configured to suppress such events where the OSS is not required to understand the power state of the DPU;
5. The PMA must store all commands, configuration changes and firmware downloads;
6. The PMA must action all stored commands, configuration changes and firmware downloads as soon as the DPU and/or individual line are powered up;
7. The PMA must change the status of stored commands, configuration changes and firmware downloads when they have been attempted to 'complete' or 'failed';
8. The PMA must report the status of stored commands, configuration changes and firmware downloads when they have been attempted; and 9. The PMA must be able to pass on events reported by the DPU.
10. The PMA must be able to aggregate information from the DPU to generate statistics which are available on request by the OSS/NMS.

Figure 3:
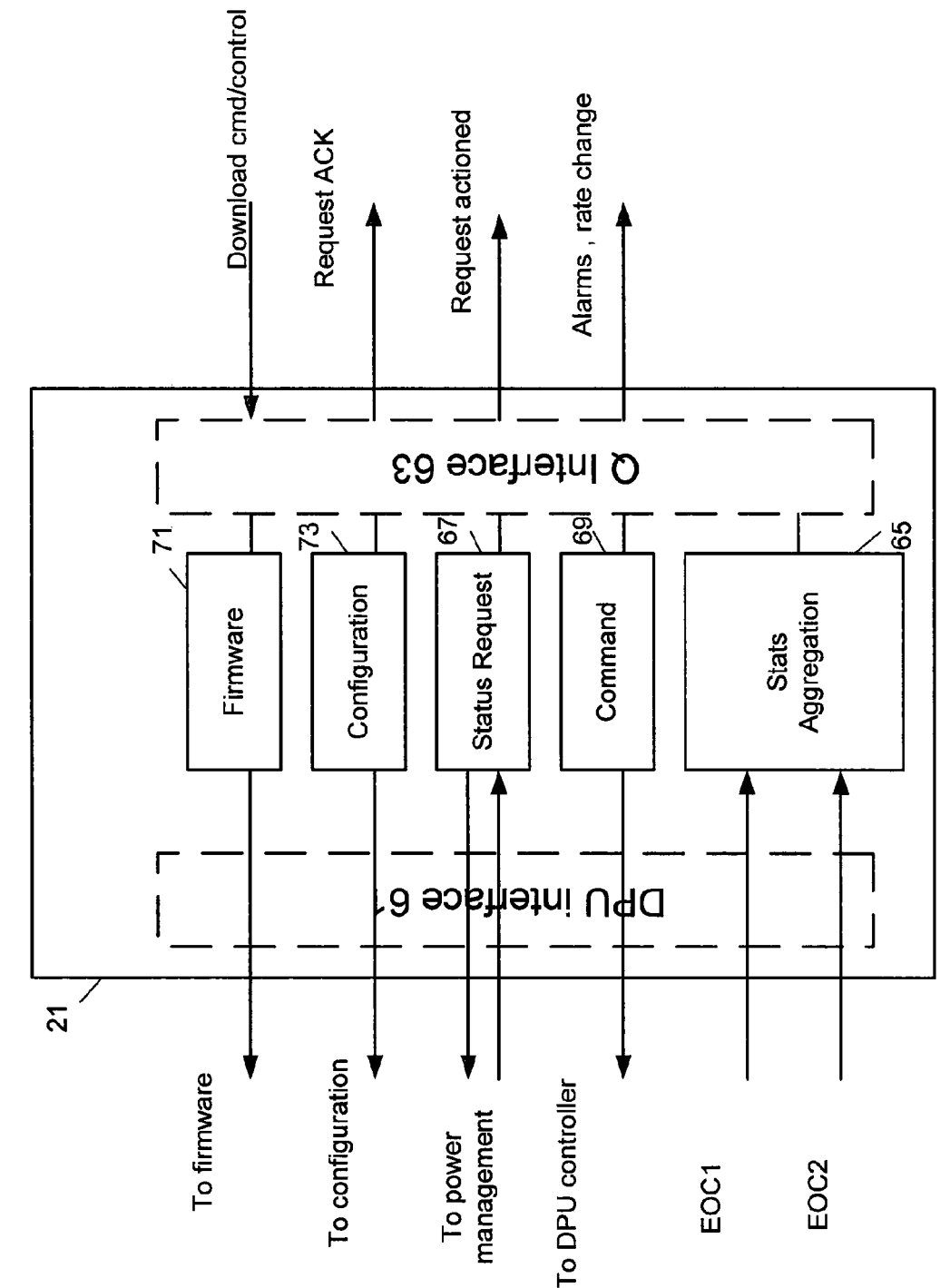
FIG. 3 schematically shows a persistent management agent in more detail.

FIG. 3 schematically shows the structure of the PMA 21 located in the network core 5. In this embodiment, there is a PMA for each DPU and it handles requests for DPU status information on behalf of the DPU at all times regardless of its power status.

The PMA 21 contains a DPU interface 61 to communicate with the corresponding DPU 3 and a Q interface 63 for communication with the NMS 17 and OSS 19 systems.

The PMA receives performance (including errors) data from the CPE 7 and the DPU 3 via the different EOC channels into a statistics aggregation unit 65.

As mentioned above, while the PMA can set the Profile, limit PSD mask and band plan in addition to other configuration items, examples of the type of information sent to the PMA include:
Code Violation (upstream & downstream) events;
Forward Error Corrections (upstream & downstream) events;
Transmission system;
Power management state;
Initialization Success/Failure cause;
Line & Signal Attenuations (upstream & downstream);
Signal to Noise Martin information (upstream & downstream);
Actual Data Rate (upstream & downstream);
Max Attainable Data Rate (upstream & downstream);
Quiet Line Noise (upstream & downstream); and/or
HLog (upstream & downstream).

As explained earlier, in this embodiment each DPU is associated with a single PMA to act as a proxy device storing state information on various metric statistics send over the EOC interfaces. To analyse the data and create new metrics, in this embodiment, the stats aggregation function 65 will receive statistics and use them to calculate new information. Examples Include:
FECS-L counter 15 minutes/24 hours;
ES-L counter 15 minutes/24 hours;
SES-L counter 15 minutes/24 hours;
LOSS-L counter 15 minutes/24 hours;
UAS-L counter 15 minutes/24 hours;
FECS-LFE counter 15 minutes/24 hours;
ES-LFE counter 15 minutes/24 hours;
SES-LFE counter 15 minutes/24 hours;
LOSS-LFE counter 15 minutes/24 hours;
UAS-LFE counter 15 minutes/24 hours;
Full inits counter 15 minutes/24 hours; and/or
Failed full inits counter 15 minutes/24 hours.

For example in the case of the ES-LFE counter 15 mins—the stats aggregation function 65 would use the Code Violation information (amongst others), and for each second where there was a Code Violation event, the stats aggregation function 65 would increment the current 15 minute counter by 1. At the end of the 15 minute period, the value of this counter would be stored as the previous 15 minute counter and the current 15 minute counter would be reset to 0 and the process continued. If requested for the information from the NMS 17 or other management entity, the stats aggregation function 65 would at the minimum, be able to return the values of either the current or up to the previous 16 15-minute bin counters.

As described earlier, by forwarding all of the status information to the PMA 21, the problems with intermittent power loss are reduced. The DPU 3 does not need to store or communicate status data to any other devices and since the received information is held at the PMA 21 which has a much more reliable power supply, status information is available to any requesting devices regarding the status of the DPU 3 at any time since the status information storage is completely delegated to the PMA 21. When the DPU 3 is unpowered, then the PMA 21 responds to requests using the last known good data.

In addition to line metrics, the PMA 21 has a status request module 67 for communication with the DP Controller and Power Management module to determine other status information about the DPU 3, in particular it receives and processes the dying gasp from the DPU 3. A command store 69 sends instructions to the DPU Controller. In response to requests or instructions from other manager devices in the network core 5, configuration data and changes for the operation of the DPU are stored and sent to the DPU 3. Therefore in the event of power loss, this information can be restored to the DPU 3 once power is restored.

The PMA 21 acts as a proxy on behalf of the DPU 3 and is always accessible regardless of the actual power status of the DPU 3. The OSS 19 and NMS 17 often need to determine the real power state of the DPU as a whole, and each given line connected to an active CPE 7, for example for diagnostics purposes. It can choose to take into account the power state for various purposes, e.g. a new firmware download, but equally it can choose to ignore the power state. It can therefore also queue pending requests for information or commands, such as firmware upgrades in firmware store 71 and configuration store 73 and execute them when power is restored to the DPU3. This requires the concept of a pending action, whose success or otherwise, is sent to the PMA when the action or download on the DPU 3 is actually attempted. When the OSS/NMS attempts to carry out an action that needs to the DPU to be powered up to complete, the PMA 21 acknowledges receipt and understanding of the action, but will not report or mark it as complete until it has actually happened, i.e. when the DPU is next powered up.

PMA Aggregator

The PMA Aggregator 23 is present to allow for scalability when there are many PMAs. The PMA Aggregator supports all OSS/NMS management actions on a given DPU 3 and therefore it responds to requests from the NMS 17 with either aggregated metrics or the direct status information regarding a given DPU 3 or DPU line.

In summary, by moving the status reporting function out of the DPU and into a PMA located in the central office, the overall system provides the following properties:
1. The PMA intercepts all read and write requests for an intermittently powered entity.
2. The PMA remembers configuration changes and when the unpowered entity is repowered its configuration is rapidly updated with the changes since it powered down.
3. While the entity is unpowered, the PMA responds to queries with the last known good data.
4. The PMA maintains management readable MIB information about the status of the unpowered devices, including both its power state and details of which parameters have been changed and which changes are pending.
5. The PMA will in general forget previously requested parameter changes, although special classes of parameter may include dependent changes that can by applied according to a schedule. The effect is that parameter change requests from a management device may be queued while the DPU is unpowered. Once power returns, the parameter change requests are either implemented one at a time in sequence if they are time or sequence dependent. Normally only the most recent request would be applied, and the rest are quietly disregarded, 6. The intermittently powered entity can forget some or all of its configuration information and obtain fast refresh from the PMA during initialisation.

7. Firmware upgrades may be delivered to the PMA when the intermittently powered entity is unpowered and applied automatically when the target entity is repowered.

8. If the intermittently powered entity is off for period covering two firmware upgrade downloads, then these may be applied as dependent changes or one as a replacement for the other (in which case the earliest can be deleted before use.

Alternatives and Modifications

In the embodiment, each DPU has an associated PMA. In an alternative, there is a single PMA for all the DPUs and in a further alternative a PMA can be associated with a subset of the total number of DPUs.

In the embodiment, the optical network is a passive optical network. In an alternative, the network is a point to point fibre network.

What is claimed is:

1. An optical fiber network comprising:
   an optical fiber network section,
   a plurality of distribution units linking the optical fiber network section to a plurality of customer premises units via a plurality of electrical wired segments, each distribution unit being electrically powered by at least one of the customer premises units, and
   at least one proxy management unit in communication with at least one of the plurality of distribution units, wherein:
   the proxy management unit is configured to receive management data from said distribution unit, store the received management data, and to process requests for the stored management data on behalf of said distribution unit regardless of a power status of said distribution unit, and
   wherein the proxy management unit is also in communication with a manager device and is further configured to:
      receive an instruction from the manager device;
      store the received instruction; and
      upon restoration of the distribution unit's power, restore the distribution unit based upon the received instruction.

2. A management apparatus for an optical fiber network, the optical fiber network including an optical fiber network section, a plurality of distribution units linking the optical fiber network section to a plurality of customer premises units via a plurality of electrical wired segments, each distribution unit being electrically powered by at least one of the customer premises units, the management apparatus comprising:
   a communications interface configured to receive status information from a distribution unit of the plurality of distribution units,
   a memory configured to store the received status information, and
   a computer processor at least configured to:
      receive requests from other devices regarding the stored status information of the distribution unit; and
      answer requests for the stored status information from other devices on behalf of said distribution unit regardless of a power status of said distribution unit,
   wherein the management apparatus is also in communication with a manager device, the management apparatus being configured to:
      receive an instruction from the manager device;
      store the received instruction; and
      upon restoration of the distribution unit's power, restore the distribution unit based upon the received instruction.

* * * * *